United States Patent
Ng et al.

(10) Patent No.: US 10,043,605 B2
(45) Date of Patent: Aug. 7, 2018

(54) SENSORS COMPRISING PALLADIUM COMPLEX INK

(71) Applicants: Xerox Corporation, Norwalk, CT (US); Palo Alto Research Center Incorporated, Palo Alto, CA (US)

(72) Inventors: Tse Nga Ng, Sunnyvale, CA (US); Sivkheng Kor, San Jose, CA (US); Yiliang Wu, San Ramon, CA (US)

(73) Assignees: Xerox Corporation, Norwalk, CT (US); Palo Alto Research Center Incorporated, Palo Alto, CA (US)

( * ) Notice: Subject to any disclaimer, the term of this patent is extended or adjusted under 35 U.S.C. 154(b) by 605 days.

(21) Appl. No.: 14/691,868

(22) Filed: Apr. 21, 2015

(65) Prior Publication Data
US 2016/0314881 A1    Oct. 27, 2016

(51) Int. Cl.
*H01C 10/10*    (2006.01)
*G01L 1/22*    (2006.01)
*H01C 17/065*    (2006.01)

(52) U.S. Cl.
CPC ............ *H01C 10/10* (2013.01); *G01L 1/2287* (2013.01); *H01C 17/06526* (2013.01)

(58) Field of Classification Search
CPC .. H01C 10/10; H01C 17/06526; G01L 1/2287
USPC .............................................. 338/2
See application file for complete search history.

(56) References Cited

U.S. PATENT DOCUMENTS

| | | | | |
|---|---|---|---|---|
| 3,305,817 A | * | 2/1967 | Doi ............................ | C22C 5/04 338/2 |
| 5,184,516 A | * | 2/1993 | Blazic ....................... | G01B 7/16 324/718 |
| 5,242,722 A | * | 9/1993 | Hiraka .................. | G01L 1/2287 338/2 |
| 5,867,808 A | | 2/1999 | Selker et al. | |
| 8,986,891 B2 | | 3/2015 | Tanaka et al. | |
| 2003/0016116 A1 | * | 1/2003 | Blaha ....................... | G01K 7/02 338/2 |

(Continued)

OTHER PUBLICATIONS

Yiliang Wu, et al., U.S. Appl. No. 14/292,614, filed May 30, 2014, "Palladium Ink Compositions," not yet published.

(Continued)

*Primary Examiner* — Kyung Lee
*Assistant Examiner* — Iman Malakooti
(74) *Attorney, Agent, or Firm* — Marylou J. Lavoie, Esq. LLC (57) ABSTRACT

A sensor including a sensing element comprising conductive features formed on a substrate; wherein the conductive features have been formed from a palladium complex ink composition that has been deposited onto the substrate to form the deposited features and wherein the deposited features have been heated to form the conductive features on the substrate. A method including disposing a palladium complex ink composition onto a substrate to form deposited features; and heating the deposited features to form conductive features on the substrate. A strain gauge sensor including a sensing element comprising conductive features formed on a substrate; wherein the conductive features conform to a two dimensional substrate surface; or wherein the conductive features conform to a three dimensional substrate surface.

20 Claims, 4 Drawing Sheets

(56) References Cited

U.S. PATENT DOCUMENTS

| | | | |
|---|---|---|---|
| 2015/0200376 A1* | 7/2015 | Mei | H01L 51/0541 174/257 |
| 2015/0344714 A1* | 12/2015 | Wu | C09D 11/38 347/20 |
| 2016/0202202 A1* | 7/2016 | Wu | G01N 27/302 204/433 |

OTHER PUBLICATIONS

Yiliang Wu, U.S. Appl. No. 14/593,111, filed Jan. 9, 2015, "Sensors Incorporating Palladium Electrodes," not yet published.

* cited by examiner

SENSORS COMPRISING PALLADIUM COMPLEX INK

BACKGROUND

Disclosed herein is a sensor comprising a sensing element comprising conductive features formed on a substrate; wherein the conductive features have been formed from a palladium complex ink composition that has been deposited onto the substrate to form the deposited features and wherein the deposited features have been heated to form the conductive features on the substrate. Further disclosed is a strain gauge sensor comprising a sensing element comprising conductive features formed on a substrate; wherein the conductive features have been formed from a palladium complex ink composition that has been deposited onto the substrate to form the deposited features and wherein the deposited features have been heated to form the conductive features on the substrate; wherein the palladium complex ink composition comprises a palladium salt, an organic amine that forms a palladium complex from the palladium salt, and at least one solvent, wherein the at least one solvent has a boiling point at about the decomposition temperature of the palladium complex; wherein the conductive features conform to a two dimensional substrate surface; or wherein the conductive features conform to a three dimensional substrate surface. Still further disclosed is a method comprising disposing a palladium complex ink composition onto a substrate to form deposited features; and heating the deposited features to form conductive features on the substrate.

Strain sensors are needed in structural monitoring and force/pressure sensing. Commercially available strain gauges are typically made of metal serpentine traces patterned on plastic foils which are bonded to the structures under test. The bonding step adds additional cost, places constraints on form factor, and affects measurement sensitivity.

U.S. Pat. No. 5,184,516, which is hereby incorporated by reference herein in its entirety, describes a bonded strain gauge comprising at least a first length of planar serpentine trace; support means, affixable to a surface, for supporting said at least a first planar serpentine trace and for transmitting strain and crack forces from said surface to said at least a first planar serpentine trace; circuit means, connected to said at least a first planar serpentine trace, for measuring resistance changes in said at least a first planar serpentine trace; and protection layer means, affixed to said support means and said at least a first planar serpentine trace, for protecting said at least a first length of serpentine trace and for supporting said circuit means.

Thick film strain gauges are described, for example, in U.S. Pat. No. 5,867,808. U.S. Pat. No. 5,867,808, which is hereby incorporated by reference herein in its entirety, describes in the abstract thereof a force transducer that includes an elongated lever arm attached to a substrate having a central portion and substantially planar tab regions that project outwardly from the central portion along first and second orthogonal force-detecting axes. The substrate undergoes localized strain approximately at the junctions of the tab regions and the central portion where an external force is applied to the free end of the lever arm. A thick film strain gauge material is screen printed directly onto the substrate in at least a first location and a second location and conductive pads on the substrate are electrically coupled to the thick film strain gauge material at each location to define a first strain gauge oriented along the first force detecting axis and a second strain gauge oriented along the second force detecting axis. The lever arm can be of a compliant construction to provide propriorreceptive feedback to a user.

Currently available sensors are suitable for their intended purposes. However a need remains for improved sensors. Further, a need remains for improved strain gauge sensors that can be prepared by additive printing. Further, a need remains for improved sensors that can be ink jet printed. Further, a need remains for conformal sensors that can be ink jet printed. Further, a need remains for conformal sensors that can be ink jet printed onto two dimensional and three dimensional substrates.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a method for forming a strain gauge sensor comprising disposing a palladium complex ink composition onto a substrate to form deposited features; and heating the deposited features to form conductive features on the substrate, wherein the deposited features form a strain gauge sensor.

Also described is a strain gauge sensor comprising a sensing element comprising conductive features formed on a substrate; wherein the conductive features have been formed from a palladium complex ink composition that has been deposited onto the substrate to form the deposited features and wherein the deposited features have been heated to form the conductive features on the substrate, wherein the deposited features form a strain gauge sensor.

Also described is a strain gauge sensor comprising a sensing element comprising conductive features formed on a substrate; wherein the conductive features have been formed from a palladium complex ink composition that has been deposited onto the substrate to form the deposited features and wherein the deposited features have been heated to form the conductive features on the substrate; wherein the palladium complex ink composition comprises a palladium salt, an organic amine that forms a palladium complex from the palladium salt, and at least one solvent, wherein the at least one solvent has a boiling point at about the decomposition temperature of the palladium complex; wherein the conductive features conform to a two dimensional substrate surface; or wherein the conductive features conform to a three dimensional substrate surface.

DETAILED DESCRIPTION

In embodiments, a palladium complex ink is provided to additively pattern strain gauges that are more sensitive than commercial strain gauges. The fabrication method herein eliminates the bonding step required of previous methods. The method herein enables the production of thin film sensors. Further, the fabrication method herein enables preparation of strain gauges having a conformal form factor over the structures under test.

In embodiments, the palladium complex ink provides better adhesion to plastic substrates than conventional silver ink. The adhesion advantage provided by embodiments herein makes the sensor more scratch-proof and robust than previously available sensors.

In embodiments, the gauge factor of the palladium complex ink strain sensors provided herein is higher than conventional metal foil strain sensors which typically have a gauge factor of about 2. The higher gauge factor exceeds the contribution from Poisson-ratio change. Without wishing to be bound by theory, the gauge factor is believed to have contributions from the internal microstructure of the palladium conductor.

In embodiments, the strain gauges herein comprise a thin film of the palladium conductor. Thus, the present embodiments provide the advantage of a thin film over thick film strain gauges. For an example of a thick film strain gauge, see U.S. Pat. No. 5,867,808, entitled "Force Transducer With Screen Printed Strain Gauges," which is hereby incorporated by reference herein in its entirety. The thinner films of the present embodiments reduce cracking issues, lower material costs, and are more compatible with low-profile, embedded sensor applications.

In embodiments, a sensor is provided comprising a sensing element comprising conductive features formed on a substrate; wherein the conductive features have been formed from a palladium complex ink composition that has been deposited onto the substrate to form the deposited features and wherein the deposited features have been heated to form the conductive features on the substrate.

The sensor herein can comprise any suitable or desired type of sensor. In embodiments, the deposited features form a strain gauge sensor.

Thin film sensors are provided herein. In embodiments, after heating, the resulting electrically conductive line has a thickness ranging from about 100 to about 20,000 nanometers, or from about 150 to about 10,000 nanometers. In certain embodiments, after heating, the resulting electrically conductive line has a thickness of from about 250 to about 5,000 nanometers.

In certain other embodiments, the deposited features comprise a thin film of the ink, wherein the thin film has a line thickness after heating controllable from about 50 nanometers to about 500 nanometers. In embodiments, the thin film has a line thickness after heating of less than about 500 nanometers. In a specific embodiment, the thin film has a line thickness after heating of from about 100 nanometers to less than about 500 nanometers or from about 50 nanometers to less than about 500 nanometers.

Any suitable or desired ink composition can be employed in preparing the sensors herein. The ink composition used herein can comprise a palladium ink composition as described in U.S. patent application Ser. No. 14/292,614, which is hereby incorporated by reference herein in its entirety. In embodiments, the ink composition for forming the conductive features herein comprises a palladium salt, an organic amine that forms a palladium complex from the palladium salt, and, at least one solvent, wherein the solvent has a boiling point at about the decomposition temperature of the palladium complex. In embodiments, the inks comprise one or more solvents having an effective boiling point in a range of from about 140° C. to about 190° C.

The ink composition used herein can comprise a palladium ink composition as described in U.S. Pat. No. 8,986,891, which is hereby incorporated by reference herein in its entirety. In embodiments, the ink composition herein can comprise a non-catalytic palladium precursor composition comprising a palladium salt and an organoamine which together form an amorphous complex, wherein the composition is substantially free of reducing agent and water; wherein the organoamine is a water immiscible monoamine selected from the group consisting of octylamine, nonylamine, decylamine, undecylamine, dodecylamine, tridecylamine, tetradecylamine, hexadecylamine, dipentylamine, dihexylamine, diheptylamine, dioctylamine, dinonylamine, didecyl amine, propylpentyl amine, butylpentylamine, tributylamine, and trihexylamine; and wherein the total number of carbon atoms in the palladium salt and the organoamine combined is at least 12.

In embodiments, the particular palladium salt, organic amine, and solvent combination employed in the inks can be tuned to a target decomposition temperature for thermal compatibility with the substrate on which the ink is to be printed. Because the inks and methods of using the inks avoid the use of harsh chemical agents, including strong acids, bases, or strong reducing agents, the neutral thermal conditions provide access to printed palladium circuitry on otherwise challenging substrates such as, but not limited to, polyesters, polyimide, PEEK, PSN, and the like.

As used herein, "palladium salt" refers to any salt of palladium in its non-zero oxidation state. Common oxidation states of palladium are 0 (that is, zero-valent metal), +1, +2, and +4, with +2 palladium salts currently being the most commonly commercially available salts.

As used herein "organic amine" refers to an organic compound with an amine (primary $NH_2$ or secondary NHR, R typically being a $C_1$-$C_4$ lower alkyl fragment) functionality capable of serving as a ligand on a metal center. In particular embodiments, the "organic amine" is an aliphatic amine. Aliphatic amines include alkanes, alkenes, and alkynes.

As used herein, "complex" refers to a metal atom having one or more organic ligands associated therewith via bonds which can be dative, ionic, coordinative, or covalent in nature. The nature of the bond is typically governed by the electron affinities of the respective components and the surrounding pH, and may have characteristics of any of the bonding motifs.

As used herein, "decomposition temperature," when used in reference to the palladium complexes formed from the palladium salt and the organic amine, refers to the temperature at which the palladium ion in the complex is reduced from its present oxidation state to its zero-valent metal oxidation state. For example, the decomposition temperature of a palladium (II) complex is the temperature at which palladium (II) is thermally converted to palladium (0). In accordance with embodiments disclosed herein, this reduction is achieved without the need for introducing secondary reducing agents in a separate step. Without being bound by theory, the organic amine of the palladium complex may serve as the reducing agent for this reaction. The "decomposition temperature" can be approximated visually by the emergence of palladium nanoparticles (black in contrast to the light yellow or clear complex) and/or metallic palladium on the substrate on which it is disposed.

A variety of metal salts may be used in the ink formulation provided that such metal salts readily form amine complexes and provide sufficiently low decomposition temperatures for substrate compatibility. In particular embodiments, metal salt-organic amine combinations are particularly suitable when the resultant complex is in a liquid form rather than solid form at about 30° C. or at room temperature, although solids may also be used when coupled with an appropriate solvent for ink jet compatible viscosity profiles. Suitable metal salts include, but are not limited to, metal acetates, metal halides, metal acetylacetonates, metal formats, metal nitrates, metal nitrites, metal oxides, metal gluconates, metal fluoroborates, metal alkylsulfonates, metal sulfates, metal sulfites, metal thiosulfates, metal thiocyanates, and metal cyanides.

In embodiments, the metal salts are salts of a weak acid, such as acetate or carbonate. In embodiments, where a metal formate is sufficiently stable, it may be employed in an ink composition. In such embodiments, the formate ligand may serve as an internal reducing agent such that the formate salt alone may be used in the ink absent even an organic amine ligand, although inclusion of an organic amine may still be desirable for achieving good ink jetting properties. For example, the organic amine may provide an appropriate viscosity or provide the palladium complex in a convenient liquid phase.

Exemplary metal salts include, but are not limited to, palladium acetate, palladium acetylacetone, palladium carbonate, palladium chloride, palladium sodium chloride, palladium potassium chloride, palladium ammonium chloride, palladium sulfate, palladium nitrate, and palladium oxide. In embodiments, the palladium salt selected is palladium acetate or palladium carbonate. In a specific embodiment, the palladium salt is palladium acetate.

In embodiments, the inks comprise an organic amine component which may form a complex with the palladium salt. Such amines may be monodentate, bidentate, tridentate ligands, and so on, that is, any multidentate ligand. Exemplary multidentate ligands include, but are not limited to, 1,2-diaminopropane, 1,3-diamopropane, diethylenetriamine, 1,4-diaminobutane, 1,6-diaminohexane, N,N'-dimethyl-1,3-propanediamine, N,N,N',N'-tetramethylethylenediamine, and 2-hydroxy-1,3-diaminopropane.

The organic amines may be aliphatic straight-chain or branched monoamines or diamines, such as ethylenediamine, or triamines. In embodiments, the organic amine is an aliphatic amine having 7 to 18 carbon atoms. The organic amine may be selected from the group consisting of propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, N,N-dihexylamine, N,N-diheptylamine, N,N-dioctylamine, N,N-dinonylamine, N,N-didecylamine, N,N-diundecylamine, N,N-didodecyl amine, methylpropylamine, ethylpropylamine, propylbutylamine, ethylbutylamine, ethylpentylamine, propylpentylamine, butylpentylamine, trimethylamine, tripropylamine, tributylamine, tripentylamine, trihexylamine, triheptylamine, trioctylamine, 1,2-ethylenediamine, N,N,N',N'-tetramethylethylenediamine, propane-1,3-diamine, N,N,N',N'-tetramethylpropane-1,3-diamine, butane-1,4-diamine, N,N,N',N'-tetramethylbutane-1-4-diamine, and mixtures thereof.

The selection of an organic amine may depend on, inter alia, the particular metal salt and the target viscosity when combined with solvent. In embodiments, the amine is selected to form a metal complex that is a liquid at about 30° C. or at room temperature (about 23° C. to about 25° C.). Another factor in the selection of amine may include its volatility. Without being bound by theory, at elevated temperatures the amine may serve as an internal reducing agent. Thus, it may be beneficial to have an amine of sufficient molecular weight that it does not volatilize too easily. Volatility may also be modulated via degree of hydrogen bonding. On the other hand, it may also be beneficial to have sufficiently volatile amine-related byproducts such that after reduction of the palladium complex to zero-valent palladium, minimal carbonaceous residue is left behind. In the interest of balancing these effects, the organic amine may be an aliphatic amine having about 7 to 9 carbon atoms. In embodiments, the organic amine is n-octylamine.

While embodiments disclosed herein describe the use of organic amines to provide a thermally degradable palladium complex, those skilled in the art, with the benefit of the guidance herein, will recognize that other ligands may be employed that perform substantially the same function. Such ligands may include, but are not limited to, organic thiols (that is, mercaptans), thioethers, and xanthic acid.

In embodiments, the one or more solvents have a boiling point between about 140° C. to about 220° C., such as from about 140° C. to about 190° C., or from about 140° C. to about 180° C., or from about 140° C. to about 160° C. Smooth thermal decomposition to palladium zero beings at about 140° C.

In embodiments, the solvent does not include hydroxylic solvents or other protic solvents. In embodiments, the solvent does not include solvents that can compete as ligands to bind to the metal center, thus further excluding polar aprotic solvents. In embodiments, the one or more solvents are hydrocarbon-based solvents, and in particular embodiments, aromatic hydrocarbon solvents. In embodiments, the solvent is selected from the group consisting of t-butylbenzene, m-xylene, ethylbenzene, propylbenzene, pentylbenzene, and mixtures thereof.

In embodiments, the fully formulated inks are Newtonian fluids. In embodiments, the inks have a viscosity in the range of from about 5 centipoise (cps) to about 30 cps at about 40° C., including from about 5 cps to about 25 cps, or from about 5 cps to about 20 cps. That is, the viscosity range is selected appropriately for ink jet printing applications. The target viscosity can be obtained by varying the organic amine, the one or more solvents, or both. For example, increasing carbon chain length of a straight chain alkylamine can be used to increase viscosity.

In embodiments, a method herein includes depositing a palladium complex ink onto a substrate to form an image and heating the deposited image to the decomposition temperature of the palladium complex, wherein the deposited image is substantially preserved during heating without bulging or de-wetting. In embodiments, the depositing is carried out by additive printing methods including ink jet, gravure, flexography printing, and the like.

The sensors herein can be printed additively, in embodiments with a palladium complex ink. The conductive features can be printed directly onto a substrate, without requiring bonding. Any suitable or desired substrate can be selected for the sensors herein. In embodiments, the substrate on which the ink is deposited may be any insulating material, such as an insulating plastic, glass, or the like. In embodiments, the substrate may be multilayered. The substrate top layer in a multilayered structure may be insulating and optionally, this top layer may have discontinuities, that is, areas (holes, lines, and the like) that expose lower layers to allow for electrical communication between the printed palladium ink and one or more of the lower layers. In some embodiments, a separate pattern may be printed on opposing sides of an insulating substrate or multilayer substrate. In some such embodiments, there may be one or more intervening insulating layers. The patterns printed on opposing sides may be optionally configured to be in electrical communication with each other. In embodiments, the image on the substrate may be a printed circuit, a thin film, or the like.

In embodiments, the substrate is a two dimensional substrate. That is, the substrate comprises a two dimensional surface having length and breadth but no (or essentially no) depth, such as a flat plastic film.

In embodiments, the substrate is a three dimensional substrate. That is, the substrate comprises a three dimensional volume having length, breadth, and depth. In embodiments, the substrate is a three dimensional substrate and the sensing element comprises conductive features that are conformal to the shape of the substrate. The conformal conductive features are disposed onto the substrate, such as by ink jet printing, and do not require bonding to the substrate.

In embodiments, the conductive features conform to a two dimensional substrate surface. In other embodiments, the substrate is a three dimensional substrate and the sensing element comprises conductive features that are conformal to the shape of the three dimensional substrate.

The conductive features can comprise any suitable or desired geometric configuration. In embodiments, the conductive features comprise multi-directional serpentine traces, concentric coils, concentric coils that are disposed upon three dimensional objects (substrates), sensors disposed on substrates having step-like configurations, and combinations thereof.

In embodiments, the sensors herein comprise strain gauge sensors. Gauge factor (GF) or strain factor of a strain gauge is the ratio of relative change in electrical resistance R, to the mechanical strain ε. The gauge factor is defined as:

$$GF = \frac{\frac{\Delta R}{R}}{\varepsilon} = \frac{\frac{\Delta \rho}{\rho}}{\varepsilon} + 1 + 2v$$

where ε=strain=ΔL/Lo
ΔL=absolute change in length
Lo=original length
v=Poisson's ratio
ρ=Resistivity
ΔR=change in strain gauge resistance
R=unstrained resistance of strain gauge.

The strain gauge sensors herein have a gauge factor of about 2.98 for compressive strain or about 4.95 for tensile strain. In embodiments, the sensor herein comprises a strain gauge sensor having a gauge factor greater than about 2.5. In embodiments, the sensor comprises a conformal strain gauge sensor having a gauge factor of greater than about 3.0. In embodiments, conformal sensor device structures are provided which have a gauge factor of greater than about 3.0 that span over a two dimensional surface or a three dimensional volume.

In a specific embodiment, a strain gauge sensor herein comprises a sensing element comprising conductive features formed on a substrate; wherein the conductive features have been formed from a palladium complex ink composition that has been deposited onto the substrate to form the deposited features and wherein the deposited features have been heated to form the conductive features on the substrate; wherein the palladium complex ink composition comprises a palladium salt, an organic amine that forms a palladium complex from the palladium salt, and at least one solvent, wherein the at least one solvent has a boiling point at about the decomposition temperature of the palladium complex; wherein the conductive features conform to a two dimensional substrate surface; or wherein the conductive features conform to a three dimensional substrate surface or volume.

A method herein comprises disposing a palladium complex ink composition onto a substrate to form deposited features; and heating the deposited features to form conductive features on the substrate.

In certain embodiments, the deposited features are disposed so to form a strain gauge sensor.

Disposing the ink composition can be by any suitable or desired method to deposit the ink composition on the substrate to form the desired features. In embodiments, disposing the ink composition comprises ink jet printing.

In embodiments, the conductive features are formed by ink jetting the ink composition onto the substrate followed by heating.

Heating the deposited ink composition can be to any suitable or desired temperature, such as to from about 70° C. to about 250° C., or any temperature sufficient to induce "annealing" or photonic sintering and thus form an electrically conductive layer which is suitable for use as an electrically conductive element in electronic devices. The heating temperature is one that does not cause adverse changes in the properties of previously deposited layers or the substrate. In embodiments, use of low heating temperatures allows use of flexible substrates including low cost plastic substrates which have an annealing temperature of below 200° C.

In embodiments, the conductive features are formed by ink jetting the ink composition onto a substrate followed by heating the deposited features to a temperature of from about 190° C. to about 250° C. or from about 200° C. to about 250° C. In a specific embodiment, the heating temperature is below about 200° C., such as from about 190° C. to below 200° C.

The heating can be for any suitable or desired time, such as from about 0.01 second to about 10 hours. The heating can be performed in air, in an inert atmosphere, for example under nitrogen or argon, or in a reducing atmosphere, for example, under nitrogen containing from about 1 to about 20 percent by volume hydrogen. The heating can also be performed under normal atmospheric pressure or at a reduced pressure of, for example, about 1000 mbars to about 0.01 mbar.

Heating encompasses any technique that can impart sufficient energy to the heated material or substrate to (1) anneal the metal nanoparticles and/or (2) remove the optional stabilizer from the metal nanoparticles. Examples of heating techniques include thermal heating (for example, a hot plate, an oven, and a burner), infra-red ("IR") radiation, laser beam, flash light, microwave radiation, or ultraviolet ("UV") radiation, or a combination thereof.

In embodiments, the sensors herein comprise thin film sensors. In embodiments, disposing the palladium complex ink composition comprises disposing a thin film of the ink, wherein the thin film has a line thickness after heating as described hereinabove.

In embodiments, the method comprises forming deposited features which comprise conformal features that are deposited on three dimensional objects and wherein the deposited features conform to the shape of the three dimensional object (substrate).

In embodiments, the method comprises forming deposited features which comprise multi-directional serpentine traces, concentric coils, concentric coils that are disposed upon three dimensional objects, sensors disposed on step-like objects, any other suitable or desired geometry of features, and combinations thereof.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Digitally printed strain gauge sensors having a high gauge factor were prepared using a palladium complex ink composition which can be thermally decomposed at a low temperature of about 200° C. to conductive palladium.

Example 1

5.0 grams palladium acetate was dissolved into 12 grams octylamine to form clear yellow complex. 4.25 grams of this complex was diluted with 1.5 grams t-butylbenzene to form a jettable ink.

Example 2

4.25 grams of the palladium acetate and octylamine complex of Example 1 were diluted with 1.0 gram t-butylbenzene and 0.5 gram m-xylene.

Figure 1:
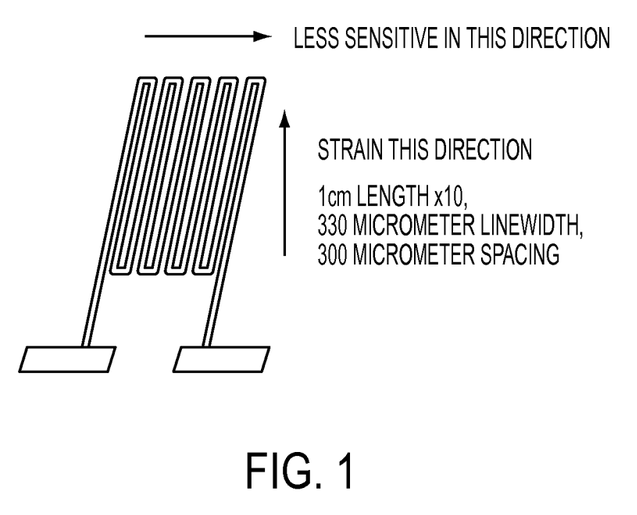
FIG. 1 is an illustration of a printed resistive strain sensor having serpentine geometry on plastic foil.

Ink jet printed resistive strain sensors were formed with the palladium complex ink on plastic substrates. FIG. 1 illustrates a printed resistive strain sensor on a plastic foil in a serpentine geometry. The line width was 350 micrometers (μm) and the serpentine structure is 1 centimeter in length times 10 turns. The metal trace was deposited by ink jet printing using a Microfab ejector (MicroFab Technologies, Inc.) and conductive ink comprising either silver nanoparticle ink or palladium complex ink.

As described hereinabove, the selection of substrates is not limited and can comprise any suitable or desired substrate. The substrates can comprise plastic film or can be free-form structures such that the strain sensor is directly patterned on or embedded in the structures. After printing the conductive traces, a layer of polymer such as polyvinylphenol of about 200 nanometers in thickness was deposited over the metal to prevent metal oxidation over time.

Figure 2A:
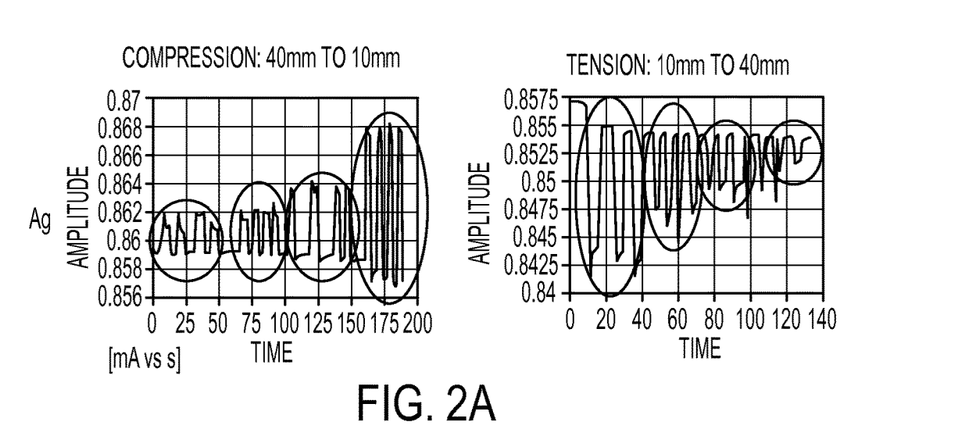
FIG. 2A is a graph showing amplitude (y-axis) versus time (x-axis) change in strain sensor current for a silver printed sensor as the sensor is compressed or tensioned at various diameters of curvature.
Figure 2B:
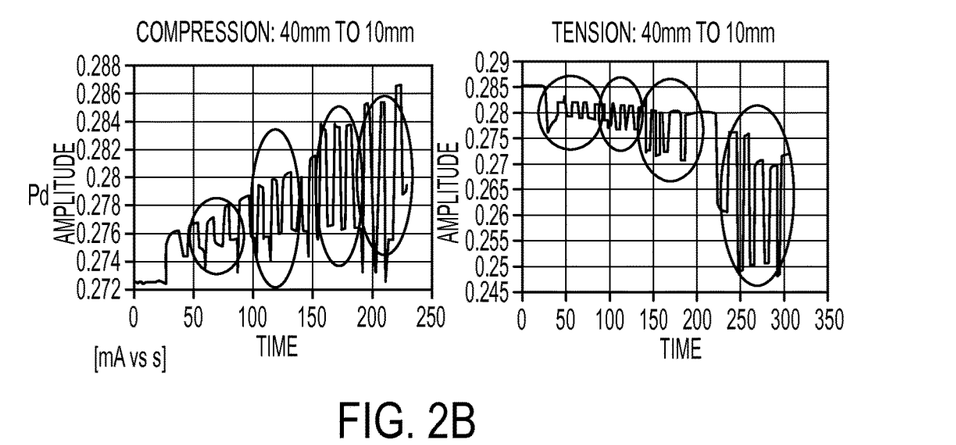
FIG. 2B is a graph showing amplitude (y-axis) versus time (x-axis) change in strain sensor current for a palladium printed sensor as the sensor is compressed or tensioned at various diameters of curvature.
Figure 3:
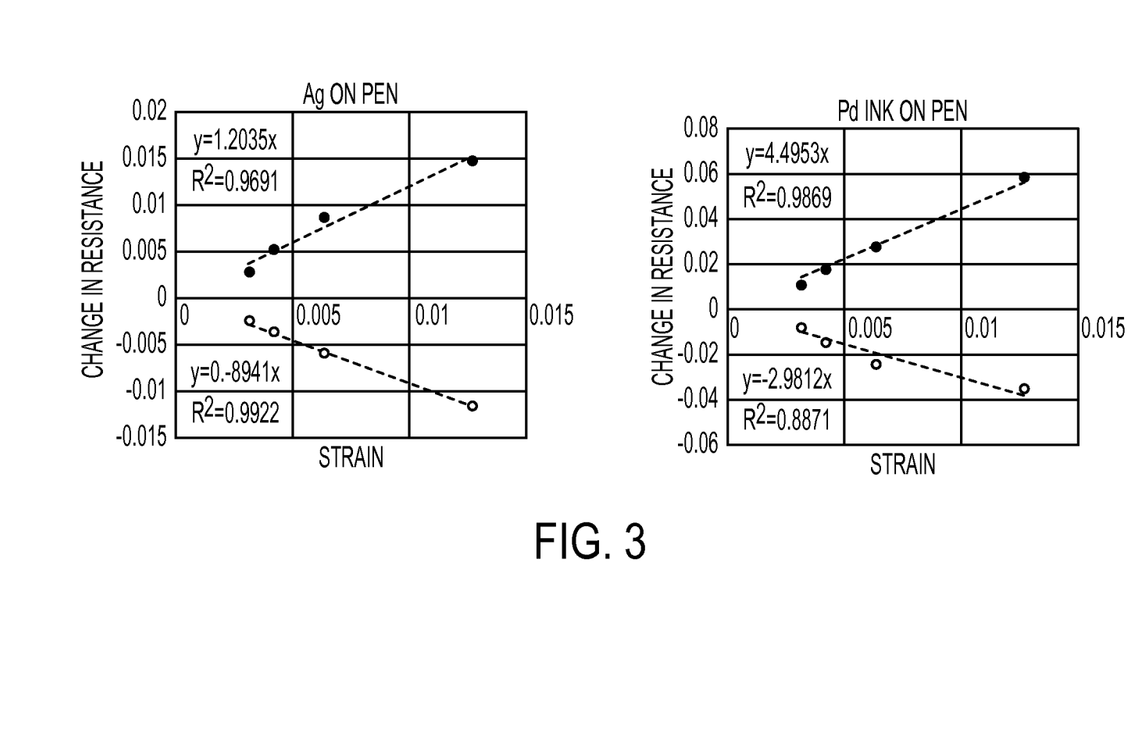
FIG. 3 is a comparison of change in resistance (y-axis) versus strain (x-axis). The fitted slope is gauge factor for printed silver strain gauge (left graph) and printed palladium strain gauge (right graph).

The palladium complex ink exhibited improved adhesion to the plastic surface as well as a higher gauge factor ranging from about 3 to about 4.5 over commercial strain gauges which typically have a gauge factor of about 2 and over a printed silver strain gauge having a gauge factor of from 0.9 to 1.2. FIGS. 2A and 2B illustrate the change in strain sensor current as the sensor is compressed or tensioned in steps of 40, 30, 20, and 10 millimeter diameter of curvature. FIG. 2A shows the measurement results for a printed silver strain gauge. FIG. 2B shows the measurement results for a printed palladium complex ink strain gauge. FIG. 3 shows a comparison of the gauge factor for a printed silver sensor (left graph) and a printed palladium complex ink strain gauge (right graph). Palladium is a much harder metal than silver and palladium shows better substrate adhesion than silver. Without wishing to be bound by theory, these factors are believed to contribute to the super gauge factor of the present palladium complex ink sensors.

Figure 4:
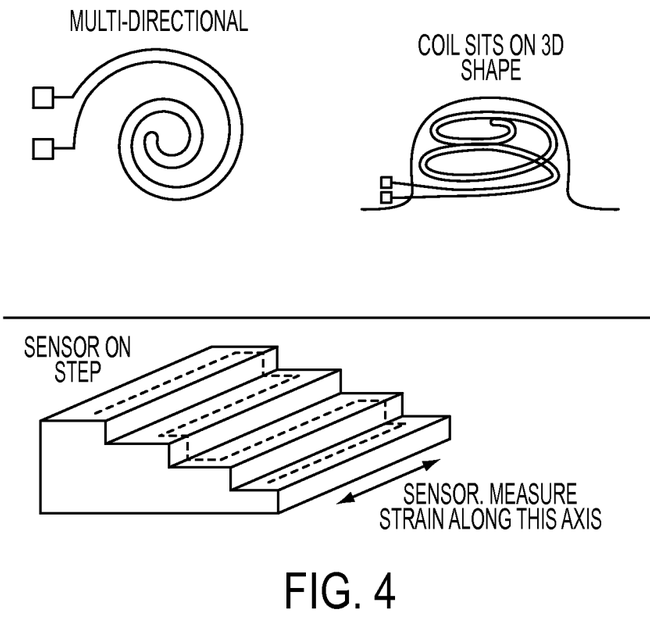
FIG. 4 is a pictorial illustration showing variations of the geometries of the present sensor embodiments including multi-directional printed conductive features, sensor feature coils conformally disposed on a three dimensional substrate, and a sensor conformally disposed on a step-like three dimensional substrate.

FIG. 4 is a pictorial illustration showing variations of the geometries of the present sensor embodiments including multi-directional printed conductive features, sensor feature coils conformally disposed on a three dimensional substrate, and a sensor conformally disposed on a step-like three dimensional substrate. The sensors herein can comprise any geometric configuration and are not limited to the exemplary embodiments. The geometric variations are unlimited and can comprise serpentine traces, double looped concentric coils, designs that are conformal to the object including, but not limited to, staircase patterns, out of plane shapes, or any suitable or desired two dimensional or three dimensional shape.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A method for forming a strain gauge sensor comprising: disposing a palladium complex ink composition onto a substrate to form deposited features; and
heating the deposited features to form conductive features on the substrate, wherein the deposited features form a strain gauge sensor.

2. The method of claim 1, wherein disposing the palladium complex ink composition comprises disposing a thin film of the ink, wherein the thin film has a line thickness after heating of from about 50 nanometers to less than about 500 nanometers.

3. The method of claim 1, wherein the palladium complex ink composition comprises a palladium salt, an organic amine that forms a palladium complex from the palladium salt, and at least one solvent, wherein the at least one solvent has a boiling point at about the decomposition temperature of the palladium complex.

4. The method of claim 1, wherein disposing the ink composition comprises a printing method selected from the group consisting of ink jet printing, gravure, and flexography.

5. The method of claim 1, wherein heating the deposited features comprises heating to a temperature of from about 190° C. to about 250° C.

6. The method of claim 1, wherein the deposited features comprise conductive features that are deposited on three dimensional objects and wherein the deposited conductive features conform to the shape of the three dimensional object.

7. The method of claim 1, wherein the deposited features comprise multi-directional serpentine traces, concentric coils, concentric coils that are disposed upon three dimensional objects, sensors disposed on step-like objects, and combinations thereof.

8. A strain gauge sensor comprising:
a sensing element comprising conductive features formed on a substrate;
wherein the conductive features have been formed from a palladium complex ink composition that has been deposited onto the substrate to form the deposited features and wherein the deposited features have been heated to form the conductive features on the substrate; and
wherein the deposited features form a strain gauge sensor.

9. The sensor of claim 8, wherein the deposited features comprise a thin film of the ink, wherein the thin film has a line thickness after heating of from about 50 nanometers to less than about 500 nanometers.

10. The sensor of claim 8, wherein the palladium complex ink composition comprises a palladium salt, an organic amine that forms a palladium complex from the palladium salt, and at least one solvent, wherein the at least one solvent has a boiling point at about the decomposition temperature of the palladium complex.

11. The sensor of claim 8, wherein the conductive features have been formed by ink jetting the ink composition onto the substrate followed by heating.

12. The sensor of claim 8, wherein conductive features have been formed by ink jetting the ink composition onto the substrate followed by heating to a temperature of from about 190° C. to about 250° C.

13. The sensor of claim 8, wherein the substrate is a three dimensional substrate and wherein the sensing element comprises conductive features that are conformal to the shape of the substrate.

14. The sensor of claim 8, wherein the conductive features comprise multi-directional serpentine traces, concentric coils, concentric coils that are disposed upon three dimensional objects, sensors disposed on step-like objects, and combinations thereof.

15. The sensor of claim 8, wherein the sensor comprises a strain gauge sensor having a gauge factor greater than about 2.5.

16. The sensor of claim 8, wherein the sensor comprises a conformal strain gauge sensor having a gauge factor of greater than about 3.0.

17. The sensor of claim 8, wherein the conductive features conform to a two dimensional substrate surface; or
wherein the conductive features conform to a three dimensional substrate surface.

18. A strain gauge sensor comprising:
a sensing element comprising conductive features formed on a substrate;
wherein the conductive features have been formed from a palladium complex ink composition that has been deposited onto the substrate to form the deposited features and wherein the deposited features have been heated to form the conductive features on the substrate;
wherein the palladium complex ink composition comprises a palladium salt, an organic amine that forms a palladium complex from the palladium salt, and at least one solvent, wherein the at least one solvent has a boiling point at about the decomposition temperature of the palladium complex;
wherein the conductive features conform to a two dimensional substrate surface; or
wherein the conductive features conform to a three dimensional substrate surface.

19. The strain gauge sensor of claim 18, wherein the deposited features have been heated to a low temperature of from about 190° C. to below 200° C. to form the conductive features on the substrate.

20. The strain gauge sensor of claim 18, wherein the deposited features on the substrate comprise an electrically conductive line having a line thickness of from about 50 nanometers to less than about 500 nanometers.

* * * * *